March 28, 1933.     A. J. CORDREY     1,903,171
SOLID $CO_2$ RECEPTACLE
Filed Jan. 7, 1932     2 Sheets-Sheet 1

INVENTOR.
Almon J. Cordrey
ATTORNEYS.

March 28, 1933.  A. J. CORDREY  1,903,171
SOLID CO$_2$ RECEPTACLE
Filed Jan. 7, 1932  2 Sheets-Sheet 2

Inventor
Almon J. Cordrey.
By
Attorneys

Patented Mar. 28, 1933

1,903,171

UNITED STATES PATENT OFFICE

ALMON J. CORDREY, OF DETROIT, MICHIGAN, ASSIGNOR TO ZERO ICE CORPORATION, A CORPORATION OF MICHIGAN

SOLID $CO_2$ RECEPTACLE

Application filed January 7, 1932. Serial No. 585,352.

My invention aims to provide an improved receptacle for shipping and storing solid $CO_2$ and similar vaporizable substances having a very low temperature.

More particularly, my invention relates to an improved construction of the walls of such containers, so that they will be rendered more effective insulators initially and will not deteriorate even after long periods of use.

In my copending application, Serial No. 530,622, filed April 16, 1931, I have disclosed a type of double-walled construction having a removable top and closed bottom wherein the bottom and side walls are gas-impervious except near the upper edges of the side walls where they are perforated to allow the passage of the $CO_2$ gas given off from the solid $CO_2$ by sublimation. The wall space is filled with a porous insulating material, such as granulated cork, and a baffle plate extends from the top of the wall space down through the center, terminating a short distance from the bottom. The $CO_2$ gas enters the wall space through the holes in the top of the inner walls and passes down through the insulating material on the inner side of the baffle, under the baffle, and is then forced up through the insulating material on the outer side of the baffle and out into the atmosphere through the holes in the upper part of the outside walls. In this way the air is displaced from the wall space and the insulating material therein is permeated with $CO_2$. As $CO_2$ gas is constantly being given off by the solid $CO_2$ in the container and is forced into the wall space, the result is that a current of cold $CO_2$ gas constantly circulates through the whole wall space and out into the atmosphere, carrying with it a certain amount of the heat which penetrates into the wall space from the outsid . This adds to the inherent insulating quality of $CO_2$ of the same temperature and causes the container as a whole to be a more efficient heat insulator.

However, the colder $CO_2$ gas is, the poorer an insulator it becomes, owing to its greater density. This effect counterbalances the heat removal eff ct of the circulating gas, which is necessarily quite cold since it has but recently been formed by the sublimation of the solid $CO_2$ at a temperature of $-109°$ F.

I have discovered that by eliminating the baffle plate the result is that the $CO_2$ gas is kept trapped in the wall space rather than circulated therethrough, but will still serve as efficiently as an insulator because, although of a somewhat higher temperature, the higher temperature will cause it to be less dense and hence will decrease its heat transmissibility. Eliminating the baffle plate simplifies the construction and makes it easier to place the insulating material between the walls.

Other beneficial results of my improved construction will appear from the following description.

In the accompanying drawings, wherein I have shown two embodiments of my invention for purposes of illustration, Fig. 1 shows a part perspective and part cross-section view of a box-like container having a top cover;

Figure 1:
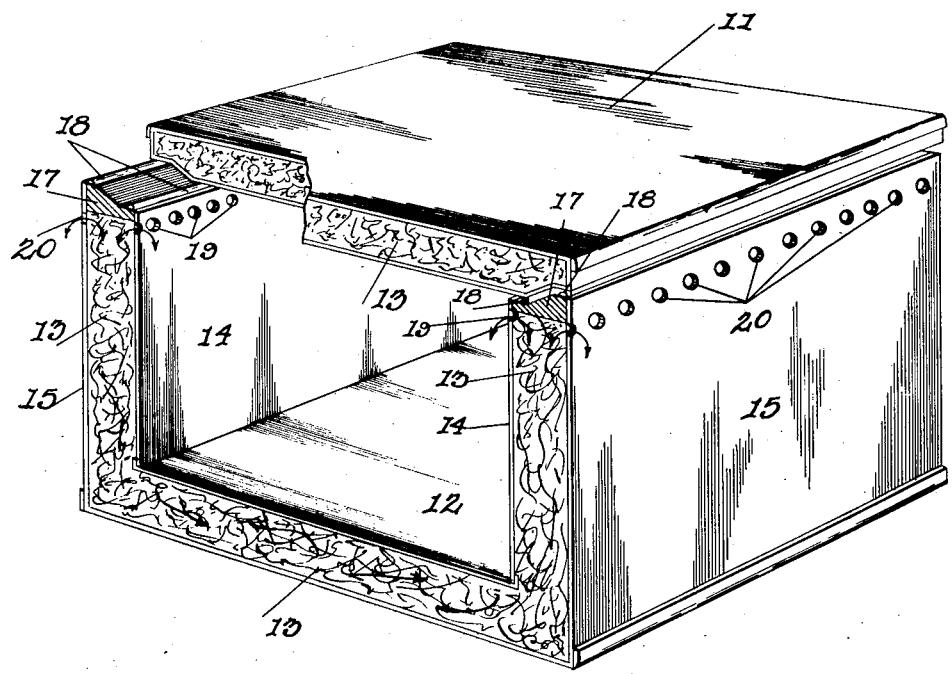

In the first embodiment of my invention selected for illustration herein and shown in Fig. 1 of the accompanying drawings, comprising a box-like container, a removable top 11 and bottom 12 are provided with inner and outer meta lic liners or facings between which is packed a gas-permeable insulating material 13, such as cotton. The cotton or like fibrous material may advantageously be packed in place so as to prevent it from settling by first coating the inside of the inner and outer facings with shellac or other adhesive material whereby the insulation may be secured prior to nesting them in place.

The sides comprise inner and outer metallic walls 14, 15, secured at their upper edges to the coping or frame 17 which is suitably shaped to support the cover. Spaced packing strips 18 may be placed between the frame 17 and the lower edge of the cover to seal the joint. Rows of holes 19, 20, are provided along the top edges of the inner and outer side walls 14, 15, immediately below frame 17. The liners, facings and side walls are lapped and secured together at their adjoining edges by rivets, welds or other suitable means to form a rigid, strong container.

The insulating space between the walls of the bottom and sides is in communication, the packing being dense enough to prevent circulation of the gas within it but not dense enough to prevent penetration of the gas throughout this space.

The gas evolved from the solid $CO_2$ in the container is approximately twice as heavy as atmospheric air and occupies about 500 times the volume of the solid from which it is produced. Hence the receptacle will fill up rapidly with gasified $CO_2$ which will displace through holes 19 whatever air may have been trapped therein.

After all the air has been expelled from the container, further evolution of $CO_2$ gas will cause it to overflow through the holes 19 and seep slowly down into the porous insulating material 13 in the side wall spaces and into the porous material in the bottom space which communicates therewith. The air contained therein will be displaced and will gradually be forced out into the atmosphere through the holes 20 in the outer wall.

Thus the entire insulation filled space of the bottom and sides will be permeated with $CO_2$ gas. This gas is not only a better insulator than air but will remove all traces of moisture from the insulating material, both because of its dryness and because of its physical-chemical action on the moisture due to its solubility therein. As the moisture laden $CO_2$ is lighter than the $CO_2$ flowing into the side wall space through the holes 19, it will be displaced and pass out through the holes 20. By this action the insulating material 13 will be rendered bone-dry and will be permeated with dry $CO_2$, thereby preventing access of moisture laden air. This is of great importance when cotton or like material is used as an insulating material, because of the marked hygroscopic properties of cotton whose fibres are so arranged as to act as capillaries. Moist cotton is only about 25% as effective an insulator as dry cotton.

Since the inner and outer facings are gastight, the $CO_2$ will only be able to escape from the insulation space at its uppermost part, that is, through holes 19, 20. The result is that the $CO_2$ gas is trapped and will remain in place even when the top of the container has been removed and the interior is filled with air. Diffusion through holes 19, 20, will take place only very slowly owing to the $CO_2$ within the walls being about 1.5 times as heavy as the outer air, even when at room temperature, and being hindered in its movements by the insulating material which it permeates.

The result is that the container may be allowed to stand unused for long periods of time and yet will be immediately effective when it is desired to be used again, since its wall material will have been kept dry by the entrapped $CO_2$ which prevents the entrance of moisture laden air into the wall spaces.

Referring again to the container when in active use, it will be seen that once the wall spaces have been filled with the $CO_2$ gas, further evolved $CO_2$ will pass directly across the wall space between holes 19 and 20 and out into the atmosphere, being permitted to do so because the only intervening object is the gas-permeable insulating material. Thus there will be no active circulation of cold gas through the whole wall space as was the case with the form of construction shown in my co-pending application already referred to.

As the $CO_2$ within the bottom and side wall spaces gradually becomes warmer, it will slowly rise, active convection currents being prevented by the insulating material which fills the space, and will pass out through holes 20 into the atmosphere, being replaced by some of the fresh $CO_2$ which is passing between holes 19 and 20. That is, there will be a certain amount of the denser and colder $CO_2$ constantly passing down into the side wall spaces along the inner facings and a like amount of lighter and warmer $CO_2$ constantly rising along the outer facings and escaping.

This slight amount of circulation will keep the $CO_2$ which permeates the insulation from becoming too warm and will cause the last traces of moisture to be removed. At the same time the essentially static condition of the gas as a whole, and its somewhat higher temperature, will cause the gas to have a lower heat transmissibility than would be the case if the insulating material was permeated with freshly evolved cold and dense $CO_2$ actively circulated therethrough.

I have found that the automatically maintained balance of conditions so resulting causes the walls to be most efficient as heat insulators.

My construction allows the cover to be removed at any time to give ready access to the whole of the interior without affecting the insulating qualities of the walls.

Figure 2:
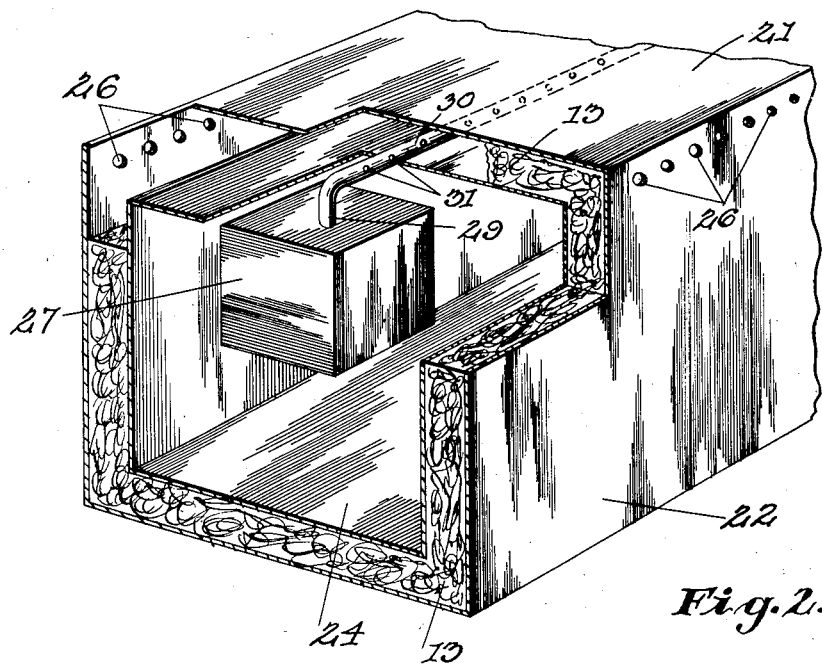
Fig. 2 shows a part perspective and part cross-section of one end of a similar container having an end opening and a special receptacle for the solid $CO_2$ charge.
Figure 3:
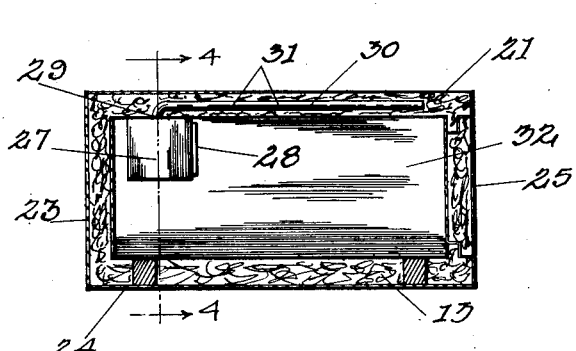
Fig. 3 shows a central vertical section.
Figure 4:
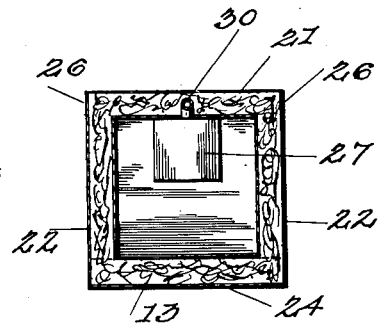
Fig. 4 shows a section on the line 4—4 of Fig. 3, of the form of container illustrated in Fig. 2.

The second embodiment of my invention selected for illustration herein and shown in Figs. 2, 3 and 4, is a solid $CO_2$ refrigerated cabinet and comprises double walled top 21, sides 22, end 23, bottom 24, and door 25, provided with inner and outer metallic liners or facings between which is packed a gas permeable insulating material 13, as in my first embodiment.

The outer side walls 22 are perforated by a series of holes 26 near their upper edges.

A solid $CO_2$ compartment 27 is provided in the upper rear central portion of the refrigerator and is provided with a gas tight door 28. The walls of this compartment are of metal or other non-insulating material so as to permit solid $CO_2$ placed therein to absorb heat from the refrigerator space 32.

A $CO_2$ gas outlet 29 in the top of compartment 27 connects with pipe 30 which passes horizontally through the top insulating space and parallel with side openings 26. This pipe is provided with a series of openings 31 throughout its length and thus serves as passage means for the $CO_2$ gas evolved in compartment 27 to pass into the top wall insulating space.

This $CO_2$ gas will thoroughly permeate the top insulating space, adding to its insulating properties and drying out the insulating material. When it reaches the upper side wall spaces it will flow down into the side walls and bottom, displacing the air therefrom through holes 26 and completely filling the same, as described in the foregoing description of my first embodiment.

Further evolved $CO_2$ gas will pass directly from holes 31 to holes 26 and out into the atmosphere, leaving the $CO_2$ gas trapped in the side and bottom wall spaces to constitute a substantially motionless insulating and drying medium.

When all of the solid $CO_2$ in compartment 27 has sublimated and the evolution of $CO_2$ has ceased, the entire insulating material within the walls will remain permeated with the gas and thus will be kept dry until the refrigerator is again placed in use. It will be seen that holes 26 in the outer walls are so near the upper edge of the side walls as to prevent the egress of the dense $CO_2$ from within the wall spaces and that the gas tight door 28 in the solid $CO_2$ compartment 27 will prevent the gas from flowing back through the only other aperture 29 in the walls.

Obviously, my invention can be applied to the construction of all types of $CO_2$ refrigerated containers, whether storage receptacles, refrigerators, shipping containers or truck compartments. Any insulating material may be used so long as it is gas permeable, although I prefer cotton because of its low cost, my construction keeping it dry at all times.

In the claims it will be understood that by the term "substantially motionless $CO_2$ gas", used with respect to the $CO_2$ gas contained in the side walls of the receptacle, I refer to $CO_2$ gas which is not in forced circulation but which is nevertheless not completely static, due to convection or thermal circulation. By the term "convection circulation" of the gas within the side wall space of the receptacle, I refer to the moderate circulation of the gas induced by the difference in temperature between the inner and outer portions of the wall space, whereby an appreciable amount of denser and colder gas will constantly pass down into the side wall spaces along the inner facing displacing a corresponding amount of lighter and warmer gas, which will rise along the outer facing and escape into the atmosphere.

The invention is not restricted to the form, materials and construction of the receptacles illustrated, but what I desire to claim and secure by Letters Patent is as follows:

1. An insulated receptacle for a substance vaporizable into a gas denser than air, having a removable closure and comprising side walls having inner and outer gas tight faces oppositely perforated near the top to permit the passage of gas freely into and out of the entire intervening wall space, thereby displacing less dense gases from the wall space and permitting convection circulation of the gas within the side wall space.

2. An insulated receptacle for a substance vaporizable into a gas denser than air, having a removable closure and comprising side walls having inner and outer gas tight faces oppositely perforated near the top to permit the passage of gas into and out of the entire intervening wall space, and gas-permeable insulation interposed between the faces of said side walls hindering but not preventing direct passage of the gas through the wall space, said construction permitting the gas to displace less dense gases from the wall spaces and permitting convection circulation of the gas within the side wall space.

3. An insulated receptacle for solid $CO_2$ having a removable closure and having double-walled side and bottom construction comprising gas-impervious inner and outer sides and bottom with gas-permeable insulation interposed therebetween, said inner and outer side walls being oppositely perforated near the upper edges, and said interposed side and bottom insulation mutually communicating and constituting a reservoir for substantially motionless $CO_2$ gas forming an insulating and drying filler for the insulation, said construction permitting convection circulation of the $CO_2$ gas within the side wall space.

4. An insulated receptacle for solid $CO_2$ having a removable top and having double-walled side and bottom construction comprising gas-impervious inner and outer sides and bottom with gas-permeable insulation interposed therebetween, said inner and outer side walls being oppositely perforated near the upper edges, and said interposed side and bottom insulation mutually communicating and constituting a reservoir for substantially motionless $CO_2$ gas forming an insulating and drying filler for insulation, said construction permitting convection circulation of the $CO_2$ gas within the side wall space.

5. An insulated receptacle for solid $CO_2$ having double-walled side and bottom construction comprising gas-impervious inner and outer sides and bottom with fibrous cotton interposed therebetween, said inner and outer side walls being oppositely perforated near the upper edges, and said interposed side and bottom insulation mutually communicating and constituting a reservoir for substantially motionless $CO_2$ gas, said construction permitting convection circulation of the $CO_2$ gas within the side wall space.

6. An insulated receptacle having a removable closure and comprising gas-impervious inner and outer walls with mutually communicating gas-permeable solid insulation interposed therebetween, openings near the upper edges of the outer side walls and means for interiorly introducing $CO_2$ gas into said insulation at substantially the same level as said openings so as to permit the direct passage of the $CO_2$ gas across the insulated side wall space to the openings, thereby allowing $CO_2$ gas to fill the wall space by displacement and to constitute a substantially motionless insulating and drying medium therein, said construction permitting convection circulation of the $CO_2$ gas downwardly in the inner part of the side wall space and upwardly in the outer part.

7. An insulated receptacle for solid $CO_2$ having a removable closure and comprising gas-impervious inner and outer walls with gas permeable insulation interposed therebetween, openings near the upper edges of the outer side walls and inlet means for evolved $CO_2$ gas from the interior of the receptacle into the upper insulating space so as to permit a substantially unhindered and horizontal flow of gas through the insulation from said inlet to said side wall openings, thereby allowing evolved $CO_2$ gas to fill the wall spaces by displacement and to constitute a substantially motionless insulating and drying medium therein, said construction permitting convection circulation of the $CO_2$ gas downwardly in the inner part of the side wall space and upwardly in the outer part.

8. A solid $CO_2$ refrigerator receptacle having a removable side closure and comprising gas impervious inner and outer sides, bottom and top walls with the mutually communicating spaces therebetween filled with fibrous cotton insulation and the outer side walls having openings near their upper edges, a gas tight non-insulated solid $CO_2$ compartment within the receptacle, passage means to allow evolved $CO_2$ gas to pass into the top insulation space whereby it may flow directly through the top insulation to the outer side wall openings and escape, said side and bottom wall spaces constituting a reservoir for substantially motionless $CO_2$ gas and said construction permitting convection circulation of the $CO_2$ gas downwardly in the inner part of the side wall space and upwardly in the outer part.

9. A solid $CO_2$ refrigerator receptacle comprising gas impervious inner and outer side, bottom and top walls with the mutually communicating spaces therebetween filled with gas permeable insulation and the outer side walls having openings near their upper edges, a gas tight non-insulated solid $CO_2$ compartment within the receptacle, passage means to allow evolved $CO_2$ gas to pass into the top insulation space whereby it may flow directly through the top insulation to the outer side wall openings and escape, said side and bottom wall spaces constituting a reservoir for substantially motionless $CO_2$ gas and said construction permitting convection circulation of the gas downwardly in the inner part of the side wall space and upwardly in the outer part.

In testimony whereof, I have signed my name to this specification.

ALMON J. CORDREY.